United States Patent
Lawrence et al.

(10) Patent No.: US 8,261,536 B2
(45) Date of Patent: Sep. 11, 2012

(54) METHOD TO DETECT FUEL VAPORIZER COKING

(75) Inventors: Don McAlpine Lawrence, Brimingham, MI (US); Scott Donald Cooper, Ann Arbor, MI (US); David T. Zultowski, Plymouth, MI (US); Michiel J. Van Nieuwstadt, Ann Arbor, MI (US); Roberto Teran, Jr., Livonia, MI (US); Emile Wheeler, III, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1065 days.

(21) Appl. No.: 12/142,677

(22) Filed: Jun. 19, 2008

(65) Prior Publication Data

US 2009/0313980 A1    Dec. 24, 2009

(51) Int. Cl.
  *G01R 17/02*    (2006.01)
(52) U.S. Cl. ........................................ 60/286
(58) Field of Classification Search ............ 60/277, 60/286; 123/145 A, 149, 179.6; 701/114; 73/114.69, 114.75; 702/58, 64, 182, 183, 702/185; 219/260–270
  See application file for complete search history.

(56) References Cited

U.S. PATENT DOCUMENTS

| | | | | |
|---|---|---|---|---|
| 3,868,939 A | * | 3/1975 | Friese et al. | 123/179.15 |
| 5,285,762 A | * | 2/1994 | Werner et al. | 123/690 |
| 5,740,675 A | * | 4/1998 | Shimasaki et al. | 60/274 |
| 7,010,909 B2 | | 3/2006 | Ranalli et al. | |
| RE41,860 E | * | 10/2010 | Nogi et al. | 123/455 |
| 2004/0040550 A1 | * | 3/2004 | Someno et al. | 123/704 |

FOREIGN PATENT DOCUMENTS

| | | |
|---|---|---|
| CN | 1184942 A | 6/1998 |
| EP | 1176292 | 7/2001 |
| EP | 1176295 | 7/2001 |
| EP | 1331373 | 1/2003 |

OTHER PUBLICATIONS

Office Action of Chinese Application No. 200910149957.1, Issued Apr. 6, 2012, State Intellectual Property Office of PRC, 2 Pages.

* cited by examiner

*Primary Examiner* — Thomas Denion
*Assistant Examiner* — Jonathan Matthias
(74) *Attorney, Agent, or Firm* — Julia Voutyras; Alleman Hall McCoy Russell & Tuttle LLP

(57) ABSTRACT

A method of supplying fuel vapor to an exhaust aftertreatment device of a motor vehicle is provided. The method includes evaporating fuel on a voltage-biased, resistive heating element, the element set in an enclosure configured to release fuel vapor to the exhaust-aftertreatment device, and indicating that the element is degraded if a current flowing through the element is less than a threshold current. In some embodiments, the threshold current is based on the ambient temperature and/or the amount of fuel in the enclosure.

14 Claims, 3 Drawing Sheets

METHOD TO DETECT FUEL VAPORIZER COKING

TECHNICAL FIELD

The present application relates to diagnostics in motor vehicles, and more particularly, in exhaust-aftertreatment components of motor vehicles.

BACKGROUND

An exhaust-aftertreatment system in a motor vehicle may include a fuel vaporizer so that fuel vapor may be provided to a downstream catalyst. Combustion of the fuel vapor at the catalyst evolves heat and removes oxygen from the exhaust stream. Either or both of these effects may allow the catalyst to reduce emissions, e.g., nitrogen oxide, more efficiently. In other examples, fuel vapor may be combusted in an exhaust-aftertreatment device in order to burn soot accumulated therein.

In U.S. Pat. No. 7,010,909, an enclosed, electrically heated glow plug is used to vaporize fuel. However, the glow plug may gradually accumulate a build-up of coke during operation. Such coking may reduce the rate at which fuel is vaporized at the glow plug, and may therefore decrease the rate of supply of fuel vapor to the catalyst.

Further, direct detection of vaporizer coking, apart from disassembling the vaporizer and inspecting the glow plug, is not provided. In the absence of direct detection, vaporizer coking can be inferred based on efficiency loss in exhaust aftertreatment, e.g. by observing greater than expected nitrogen oxide emissions from the motor vehicle. Unfortunately, this manner of detection may not specifically identify the coked vaporizer from among other possible degradation issues in the exhaust-aftertreatment system, such as degraded catalyst efficiency due to aging, for example.

The inventors herein have recognized the above issues and have devised a various approaches that may address them. Therefore, in one embodiment, a method of supplying reductant vapor to an exhaust aftertreatment device of a motor vehicle is provided. The method includes evaporating reductant on a voltage-biased, resistive heating element, the element in an enclosure configured to release reductant vapor to the exhaust-aftertreatment device, and indicating that the element is degraded if a current flowing through the element is less than a threshold current. Thus, based on the current flowing through the element, it may be possible to identify coking that degrades emission control performance. In one example, the reductant may be a fuel, such as diesel fuel. However, it may also include other reductants such as urea.

In some embodiments, the threshold current is based on the ambient temperature and/or the amount of fuel in the enclosure. Also in some embodiments, degradation may be indicated when the current flowing through the element is less than the threshold current but greater than zero, e.g., when the current is measurable but abnormally low.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
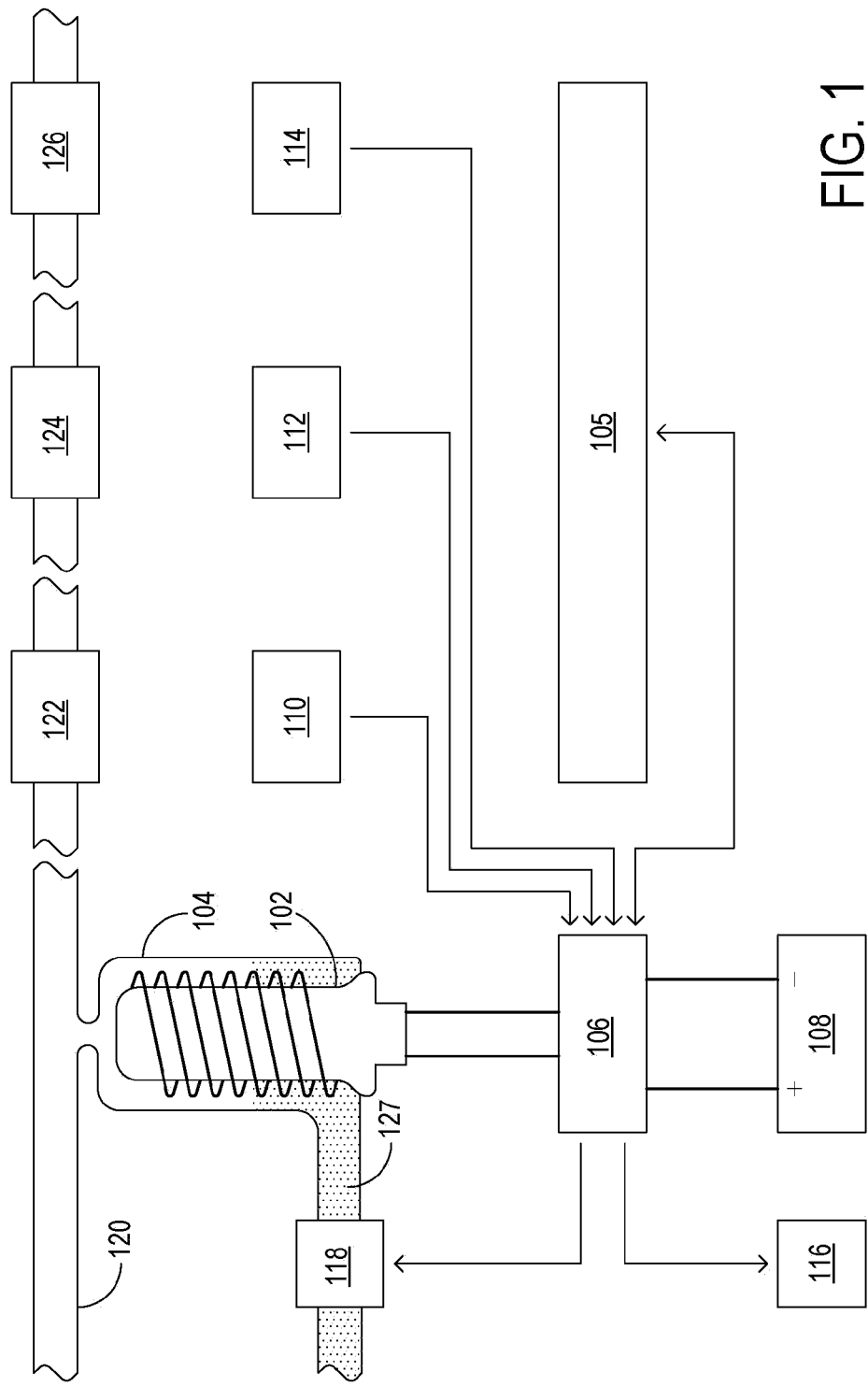
FIG. 1 shows an example configuration of motor-vehicle components used to supply fuel vapor to an exhaust aftertreatment device of a motor vehicle in accordance with the present disclosure.

FIG. 1 shows an example configuration of motor vehicle components in accordance with the present disclosure. FIG. 1 shows glow plug 102 mounted within enclosure 104, emissions-control system 105, fuel vaporizer controller 106, and battery 108. Fuel vaporizer controller 106 is configured to supply a voltage to glow plug 102, and to draw power from battery 108. FIG. 1 also shows ambient temperature sensor 110, coolant temperature sensor 112, ambient pressure sensor 114, degradation indicator 116, and control valve 118. Degradation indicator 116 is configured to indicate to the operator of the motor vehicle when the glow plug is degraded, such as due to coking. Thus, degradation indicator 116 may include a dedicated flag in the motor vehicle's on-board diagnostic system. In some examples, degradation indicator 116 may include an illuminated dashboard signal or an audible signal.

Continuing with FIG. 1, enclosure 104 is coupled to exhaust conduit 120, which conducts engine exhaust to first aftertreatment device 122. Thus, enclosure 104 is disposed in fluidic communication with the first aftertreatment device and configured to supply fuel vapor thereto. In this example, the first aftertreatment device is a diesel oxidation catalyst (DOC). In other examples, it may be a three-way catalytic device or another exhaust-aftertreatment device comprising a catalyst. The example configuration of FIG. 1 also includes second aftertreatment device 124 and third aftertreatment device 126. In this example, the second aftertreatment device is a NOX trap, and the third aftertreatment device is a diesel particulate filter (DPF). In FIG. 1, the second and third aftertreatment devices are disposed downstream of and in fluidic communication with first aftertreatment device 122, but other configurations are equally possible, and are contemplated in alternate embodiments.

Fuel vaporizer controller 106 is further configured to actuate control valve 118, which regulates a flow of liquid, hydrocarbon-containing fuel 127 into the enclosure. As noted, various other reductants may also be used in place of, or in addition to, the hydrocarbon-containing fuel. The control valve opens to admit the fuel into the enclosure and closes to prevent the fuel from entering the enclosure. Thus, by admitting a predetermined amount of fuel through control valve 118 and providing a voltage to glow plug 102, fuel vaporizer controller 106 releases a charge of fuel vapor to first aftertreatment device 122, and a reduced charge to second aftertreatment device 124 and third aftertreatment device 126. Such fuel vapor may be requested by an emissions-control system in the vehicle to provide heat to or to reduce the oxygen content in one or more of the exhaust aftertreatment devices. In providing the requested charge of fuel vapor, fuel vaporizer controller 106 may actuate control valve 118 intermittently, and may supply voltage intermittently to glow plug 102.

During non-degraded operation of the fuel vaporizer system shown in FIG. 1, some of the hydrocarbon-containing fuel may undergo cracking due to the low oxygen content within enclosure 104 and the high temperatures of glow plug 102. As a result, a deposit containing mostly amorphous carbon, and referred to as coke, may accumulate over time on the glow plug. A coke deposit may reduce the rate at which the glow plug is able to transfer heat to fuel 127 in enclosure 104. A coke deposit may also cause the glow plug to overheat and therefore to burn out. In either case, a coked glow plug may not sufficiently deliver fuel vapor to first aftertreatment device 122 at an adequate, desired, rate.

The inventors herein have recognized that the electrical resistance of a glow plug may be measurably affected by a coke deposit accumulated thereon. For example, in identical environments and when biased by the same voltage, a coked glow plug may be hotter and therefore more electrically resistive than an otherwise equivalent, uncoked glow plug. In addition, a glow plug that has overheated and burned out due to coking will be more resistive than one that has not burned out.

Thus, in this example, fuel vaporizer controller 106 is further configured to detect coking of glow plug 102 by measuring a current flowing through the glow plug while applying a fixed or varying voltage thereto, and comparing the measured current to a fixed or varying threshold current, respectively. If the measured current is less than the threshold current, then fuel vaporizer controller 106 activates degradation indicator 116 and cuts off or reduces the supply of fuel through control valve 118 at least while the degradation indicator is activated.

A number of different approaches may be used to measure or estimate the current flowing through glow plug 102. Some methods may rely on measuring a voltage across a known resistance when the current is directed through the resistance, for example. Other methods may be responsive to a magnetic field induced by the current. As such, various surrogate indications of the current may also be used, and may be compared to appropriate parameter values corresponding to the threshold current.

In this example, fuel vaporizer controller 106 is configured to read an ambient temperature from ambient temperature sensor 110 and to calculate the threshold current based on the ambient temperature and an amount of fuel admitted into enclosure 104 through control valve 118. In particular, fuel vaporizer controller 106 is configured to calculate the threshold current as a function of the ambient temperature and the amount of fuel as independent variables. To enable this calculation, fuel vaporizer controller 106 may include analog electronics comprising operational amplifiers, for example, and/or digital electronics comprising microprocessors, lookup tables, or other components known in the art to facilitate a fixed function calculation. In this example, as the ambient temperature increases, the current threshold is decreased. Likewise, as the amount of fuel admitted is increased, the current threshold is decreased.

Further, to compare measured and threshold currents, fuel vaporizer controller 106 may include analog electronics such as operational amplifiers, including those configured as differential amplifiers and comparators. Such analog electronics may further include a resistance bridge based on the Wheatstone-bridge concept. In addition to, or in place of analog electronics, fuel vaporizer controller 106 may include digital electronics comprising microprocessors, memory, and other components to facilitate numerical comparison. In some embodiments, fuel vaporizer controller 106 may be further configured to apply low-pass filtering or debouncing to the result of the comparison, and may therefore include appropriate analog or digital electronics.

In some embodiments, fuel vaporizer controller 106 may be configured to measure the current flowing through the glow plug and perform subsequent comparison only when certain conditions are met. In particular, the fuel vaporizer controller may be configured to measure the current when the ambient temperature is above a first threshold temperature, when a coolant temperature is above a second threshold temperature, and when an ambient pressure is above a threshold pressure. Additional details are provided below, in connection to FIG. 3.

In still other embodiments, fuel vaporizer controller 106 may be further configured to measure a non-zero frequency component of the glow plug impedance, and may therefore include appropriate frequency-generating and frequency-selecting analog and/or digital electronics: oscillators, lock-in amplifiers, and phase-locked loops, as examples.

It should be understood that FIG. 1 illustrates only one in a range of contemplated approaches in which a resistance change, or more generally an impedance change, is used to detect degradation of a glow plug. It should further be understood that FIG. 1 is schematic. The components included therein may comprise additional structure not shown in the figure. For example, fuel vaporizer controller 106 may comprise a plurality of interconnected electronic devices distributed throughout the motor vehicle. In some embodiments, fuel vaporizer controller 106 and emissions control system 105 may be integrated into a single module. In other embodiments one or both of these components may be integrated into a powertrain control module that controls numerous powertrain and/or emissions reducing operations. Further, no aspect of FIG. 1 is intended to be limiting. In particular, some motor-vehicle systems may include more than three, or as few as one exhaust aftertreatment device. Finally, some components referred to hereinabove may, in some embodiments, be replaced by other components, whether functionally similar or functionally distinct. For example, while the flow of fuel into the enclosure is regulated in the embodiment of FIG. 1 by control valve 118, the function of the control valve may in other embodiments be enacted via a pump or pump/valve combination. In these embodiments, the pump may be controlled by the controller and configured to pump the hydrocarbon-containing fuel into the enclosure; the controller may further configured to turn off the pump if the indicator is activated.

Figure 2:
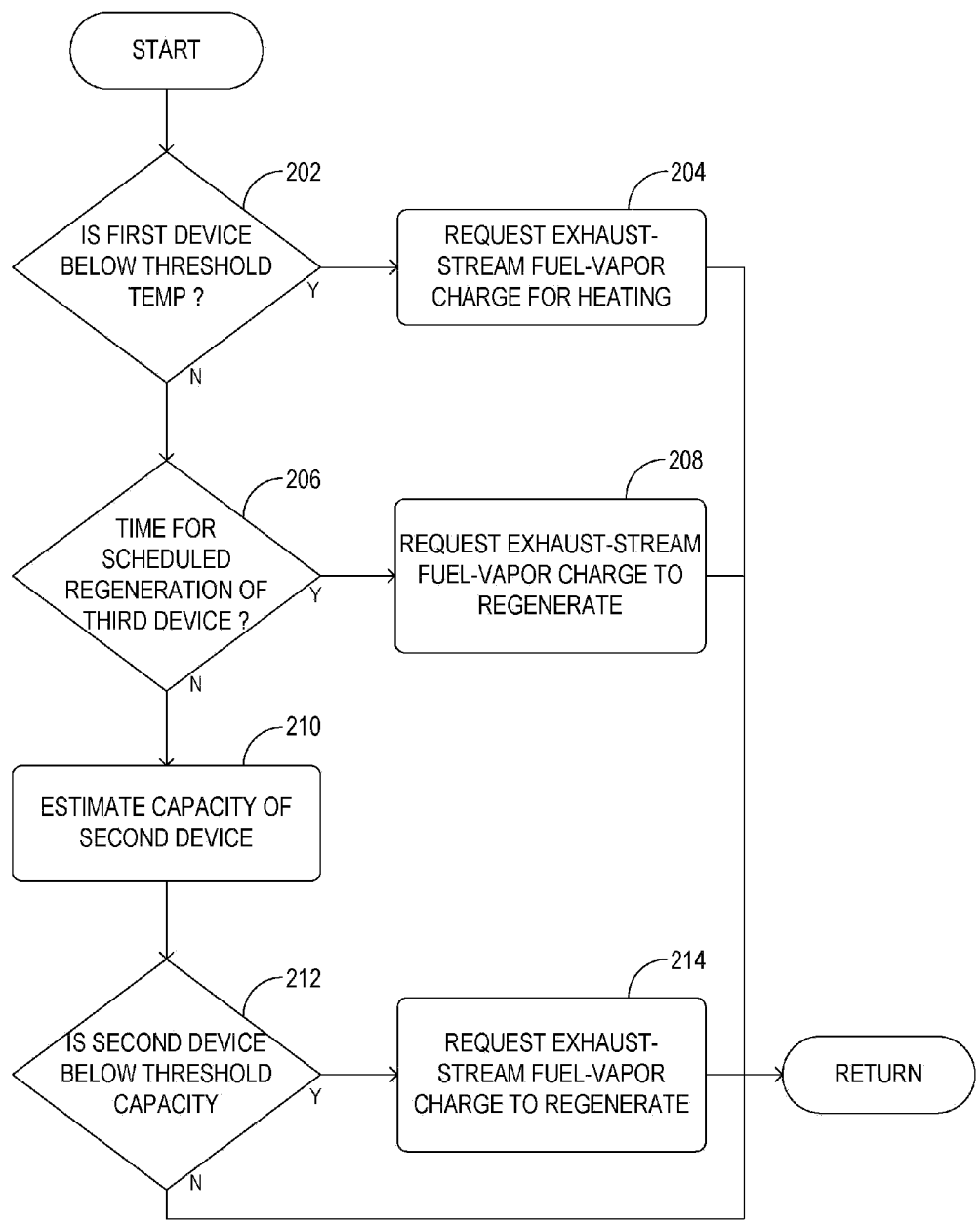
FIG. 2 illustrates an example routine by which an emissions-control system in a motor-vehicle may request an exhaust-stream fuel charge, in accordance with the present disclosure.

FIG. 2 illustrates an example routine by which an emissions-control system of a motor vehicle may request an exhaust stream fuel charge in accordance with the present disclosure. In describing the routine, continued numerical reference is made to the example components of FIG. 1. Emissions-control system 105 may be configured to execute the illustrated routine at regular intervals during vehicle operation.

In this example, the emissions-control system, at 202, determines if first aftertreatment device 122 is below a threshold temperature. If the first aftertreatment device is below a threshold temperature, then the emissions-control system, at 204, requests an exhaust-stream fuel-vapor charge for heating the device. The duration of the charge may depend on an operating parameter of the vehicle, such as a coolant temperature or a difference between a temperature of the first aftertreatment device and the threshold temperature. The requested fuel-vapor charge may then be provided in response to the request.

If the temperature of first aftertreatment device 122 is not below the threshold temperature, then the emissions-control system, at 206, determines whether a scheduled regeneration of third aftertreatment device 126, a DPF in this example, is requested. If a regeneration of the third aftertreatment device is requested, based on conditions of the third device, for example, then the emissions-control system, at 208, requests an exhaust-stream fuel-vapor charge for regenerating the third aftertreatment device. In response, the emissions-control system may then provide the requested fuel-vapor charge.

Otherwise, at 210, the emissions control system estimates a remaining capacity of second aftertreatment device 124, a NOX trap in this example. Then, at 212, the emissions-control system determines whether the remaining capacity of the second aftertreatment device is less than a threshold, in which case, the emissions control system, at 214, requests an exhaust-stream fuel vapor charge for regenerating the second aftertreatment device. Again, the emissions-control system then provides the requested fuel vapor charge.

In this way, the system may advantageously generate fuel vapor charge for improving reduction of regulated emissions in the exhaust stream.

Figure 3:
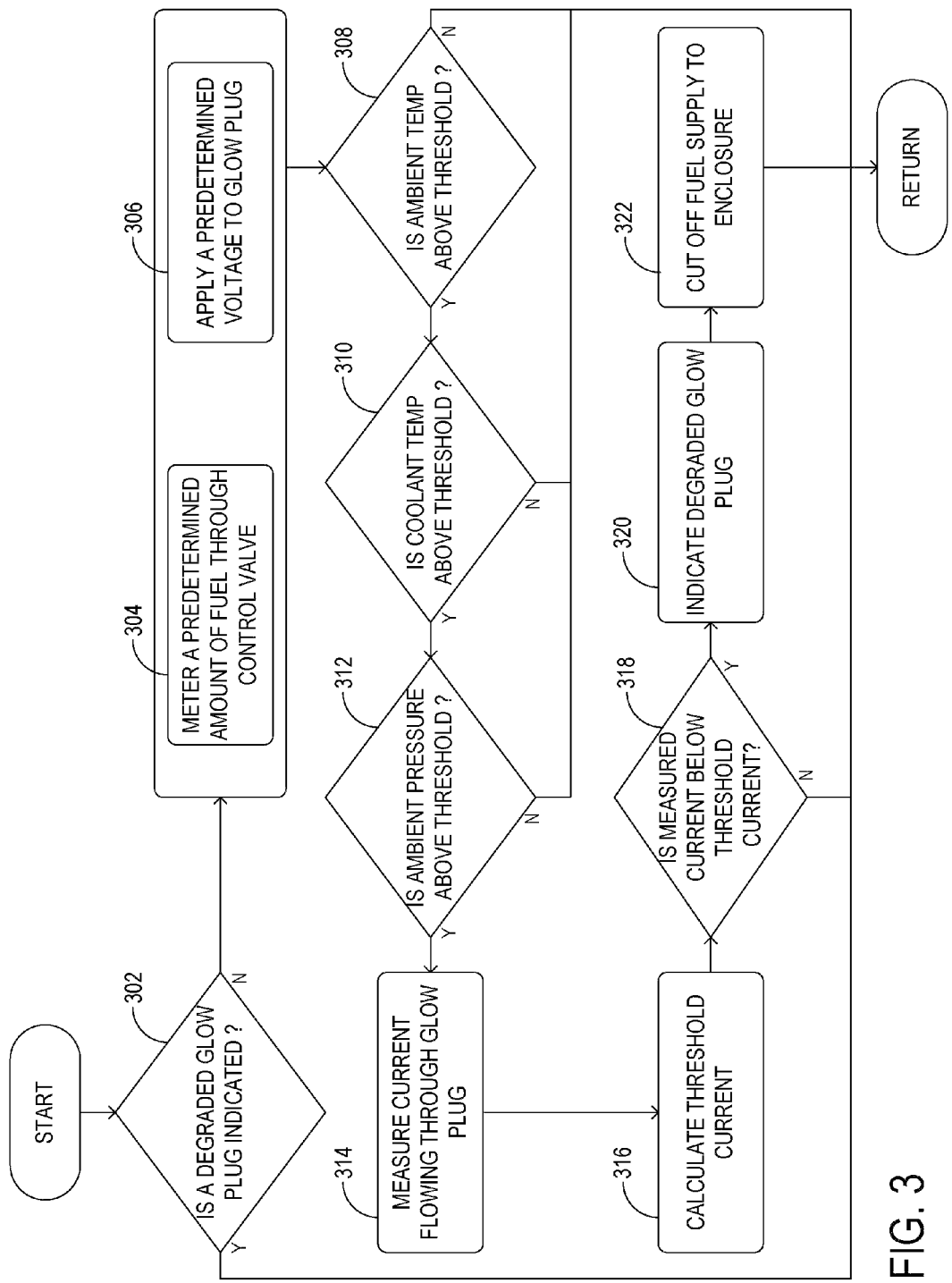
FIG. 3 illustrates an example routine for supplying fuel vapor to an exhaust aftertreatment device of a motor vehicle in accordance with the present disclosure.

FIG. 3 illustrates an example routine for supplying fuel vapor to an exhaust aftertreatment device of a motor vehicle in accordance with the present disclosure. In describing the routine, continued numerical reference is made to the example components of FIG. 1. The method includes evaporating fuel on a voltage-biased glow plug, the glow plug set in an enclosure configured to release fuel vapor to an exhaust-aftertreatment device, and indicating that the glow plug is degraded if a current flowing through the element is less than a threshold current. Fuel vaporizer controller 106 may be configured to execute the method of FIG. 3 in response to a request to supply fuel vapor to first aftertreatment device 122 is received. Such a request may originate from an emissions control system of the motor vehicle, based on whether an aftertreatment device is below a threshold temperature or threshold capacity, or when a scheduled regeneration of the device is required.

In this example, the fuel vaporizer controller, at 302, determines whether a degraded glow plug has already been indicated. Fuel vaporizer controller 106 may do so by interrogating an on-board diagnostic system of the motor vehicle. Execution of the routine ends if a degraded glow plug is already indicated. Otherwise, execution continues to 304, where fuel vaporizer controller 106 meters a predetermined amount of fuel through control valve 118 and into enclosure 104. At 306, the fuel vaporizer controller applies a voltage to glow plug 102 to cause the fuel within the enclosure to evaporate. The applied voltage may include a predetermined voltage, or a voltage level set based on operating conditions, such as the exhaust temperature, exhaust flow rate, requested amount of vaporized fuel, storage level of an exhaust-aftertreatment device, etc. It should be understood that in other embodiments equally consistent with this disclosure, the fuel vaporizer controller may be configured to pre-heat the enclosure prior to the admission of fuel thereto. Thus, step 306 may be executed before or at the same time as step 304.

The fuel vaporizer controller then compares, at 308, an ambient temperature from ambient temperature sensor 110 to a first threshold temperature. If the ambient temperature exceeds the first threshold temperature, then the fuel vaporizer controller, at 310, compares a coolant temperature from coolant temperature sensor 112 to a second threshold temperature. If the coolant temperature exceeds the second threshold temperature, then the fuel vaporizer controller compares, at 312, an ambient pressure from ambient pressure sensor 114 to a threshold pressure. If the ambient pressure exceeds the threshold pressure, then the fuel vaporizer controller measures, at 314, a current flowing through the glow plug. However, if any of the thresholds in steps 308-312 are not exceeded, then the routine is ended until another request to supply fuel vapor is received. In this way, the current measurement may be delayed until conditions are favorable for relating the measurement to whether or not the glow plug is degraded. Conditions are favorable, in this example, when the ambient temperature is above a first threshold temperature, when the coolant temperature is above a second threshold temperature, and when the ambient pressure is above a threshold pressure.

Continuing, fuel vaporizer controller 106 calculates a threshold current at 316. The threshold current may be based on various factors, which may include the ambient temperature and/or the amount of fuel metered at 304. For example, as the ambient temperature increases, the threshold current may decrease. Likewise, as the metered amount of fuel increases, the threshold current may increase. In this example, the threshold current is selected to reflect an expected current flowing through a non-degraded glow plug under the conditions bracketed above, viz., when the ambient temperature is above a first threshold temperature, when the coolant temperature is above a second threshold temperature, and when the ambient pressure is above a threshold pressure.

At 318, the fuel vaporizer controller compares the measured current from step 314 to the threshold current. In some embodiments, the comparison may involve evaluating a difference between the measured current and the threshold current. Here, the difference may advantageously be subject to low-pass filtering. In other embodiments, the comparison may involve evaluating an inequality between the measured current and the threshold current. There, the inequality may advantageously be subject to debouncing. If the measured current flowing through the glow plug is less than the threshold current, fuel vaporizer controller 106 indicates, at 320, a degraded glow plug. In some embodiments, degradation may be indicated when the current flowing through the element is less than the threshold current but greater than zero, e.g., when the current is measurable but abnormally low.

In some examples, the indication at 318 may include setting a dedicated flag or code in the motor vehicle's on-board diagnostic system. In other examples, the indication may include illuminating a dashboard signal. Finally, at 322, fuel supply to enclosure 104 is cut off or reduced by disabling control valve 118. In this way, fuel entering the exhaust system may be reduced until the degraded glow plug is replaced, or the code is reset.

In this example, the current measured at 312 includes a direct current, and the voltage applied at 304 is substantially constant while the current is being measured. In other embodiments, the applied voltage may be modulated to include alternating, non-zero frequency components. Said components may include periodic pulse trains or sinusoidal waves. In these embodiments, the measured current may be an alternating current. Further, the measured alternating current may be frequency-selected using digital and/or analog filtering methods. In some alternate embodiments, lock-in amplification may be used for frequency selection.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of supplying a reductant vapor to an exhaust aftertreatment device, comprising:
   evaporating a reductant on a voltage-biased, resistive heating element, the element disposed in an enclosure configured to release the reductant vapor to the exhaust-aftertreatment device; and
   indicating the element is degraded if a current flowing through the element is less than a threshold current, the current measured only when an ambient temperature is above a threshold temperature.

2. The method of claim 1, wherein the current flowing through the element is greater than zero, and wherein the reductant includes a fuel.

3. The method of claim 2, further comprising metering an amount of the fuel into the enclosure in advance of said evaporating.

4. The method of claim 2, wherein the threshold current is based on an amount of the fuel in the enclosure.

5. The method of claim 2, wherein the element is biased at a substantially constant voltage while the current flowing through the element is measured.

6. The method of claim 2, further comprising evaluating a difference between the current flowing through the element and the threshold current, and subjecting the difference to low-pass filtering.

7. The method of claim 2, further comprising evaluating an inequality between the current flowing through the element and the threshold current, and debouncing the inequality.

8. The method of claim 2, further comprising reducing a supply of the fuel to the enclosure if the element is indicated to be degraded.

9. The method of claim 1, wherein the threshold current is based on the ambient temperature.

10. A method of supplying a reductant vapor to an exhaust-aftertreatment device, comprising:
    evaporating a reductant on a voltage-biased, resistive heating element, the element disposed in an enclosure configured to release the reductant vapor to the exhaust-aftertreatment device; and
    indicating the element is degraded if a current flowing through the element is less than a threshold current, the current measured only when a coolant temperature is above a threshold temperature.

11. A diagnostic method comprising:
    evaporating a hydrocarbon-containing fuel on a voltage-biased glow plug disposed in an enclosure configured to release fuel vapor to an exhaust-aftertreatment device; and
    indicating the glow plug is degraded due to coking if a current flowing through the glow plug is greater than zero but less than a threshold current while metering a predetermined fuel amount to the glow plug and applying a predetermined voltage to the glow plug.

12. The method of claim 11, where said indicating includes illuminating a dashboard signal.

13. The method of claim 11, where said indicating includes setting a flag in an on-board diagnostic system of a vehicle.

14. The method of claim 11, where during the evaporating, a bias voltage of the glow plug is modulated to include alternating, non-zero frequency components, and the current flowing through the glow plug is a frequency-selected alternating current.

* * * * *